US008165367B2

(12) United States Patent
Inoue et al.

(10) Patent No.: US 8,165,367 B2
(45) Date of Patent: *Apr. 24, 2012

(54) MEDICAL IMAGE PROCESSING APPARATUS AND MEDICAL IMAGE PROCESSING METHOD HAVING THREE-DIMENSIONAL MODEL ESTIMATING

(75) Inventors: Ryoko Inoue, Hachioji (JP); Hideki Tanaka, Tama (JP); Hirokazu Nishimura, Hachioji (JP); Kenji Nakamura, Chiba (JP); Miho Sawa, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 842 days.

This patent is subject to a terminal disclaimer.

(21) Appl. No.: 12/204,375

(22) Filed: Sep. 4, 2008

(65) Prior Publication Data

US 2009/0010508 A1 Jan. 8, 2009

Related U.S. Application Data

(63) Continuation of application No. PCT/JP2007/052346, filed on Feb. 9, 2007.

(30) Foreign Application Priority Data

Mar. 8, 2006 (JP) .................................. 2006-063233

(51) Int. Cl.
*G06K 9/00* (2006.01)
(52) U.S. Cl. ......................... 382/128; 382/154; 382/190
(58) Field of Classification Search .................. 382/128, 382/154, 190
See application file for complete search history.

(56) References Cited

U.S. PATENT DOCUMENTS

| 7,102,634 | B2 * | 9/2006 | Kim et al. ...................... 345/419 |
| 7,596,256 | B1 * | 9/2009 | Arie et al. ...................... 382/131 |
| 2003/0223627 | A1 | 12/2003 | Yoshida et al. |
| 2005/0165303 | A1 | 7/2005 | Kleen et al. |
| 2009/0003671 | A1 * | 1/2009 | Inoue et al. ...................... 382/128 |

FOREIGN PATENT DOCUMENTS

| JP | 11-337845 | 12/1999 |
| JP | 2005-506140 | 3/2005 |
| JP | 2005-177477 | 7/2005 |
| WO | WO 03/034176 A2 | 4/2003 |

OTHER PUBLICATIONS

Yan-jun, P., "A new tissue segmentation algorithm in 3d data based on boundary model and local character structure", Proceedings. SPIE—The International Society for Optical Engineering, vol. 6044, 2005, p. 60441J.1-60441J.6.

* cited by examiner

*Primary Examiner* — Phat X Cao
(74) *Attorney, Agent, or Firm* — Scully, Scott, Murphy & Presser, P.C.

(57) ABSTRACT

A medical image processing apparatus of the present invention has a three-dimensional model estimating section for estimating, based on an inputted two-dimensional image of an image of a living tissue within a body cavity, a three-dimensional model of the living tissue, a shape feature value calculating section for calculating shape feature values of respective voxels included in the three-dimensional model of the living tissue, a three-dimensional shape extracting section for extracting a first voxel group whose three-dimensional model has been estimated as a predetermined shape, in the respective voxels included in the three-dimensional model of the living tissue, based on the shape feature values, and a protruding shape detecting section for detecting the first voxel group as a voxel group configuring a protruding shape in the three-dimensional model of the living tissue.

22 Claims, 10 Drawing Sheets

US 8,165,367 B2

MEDICAL IMAGE PROCESSING APPARATUS AND MEDICAL IMAGE PROCESSING METHOD HAVING THREE-DIMENSIONAL MODEL ESTIMATING

CROSS REFERENCE TO RELATED APPLICATION

This application is a continuation application of PCT/JP2007/052346 filed on Feb. 9, 2007 and claims benefit of Japanese Application No. 2006-063233 filed in Japan on Mar. 8, 2006, the entire contents of which are incorporated herein by this reference.

BACKGROUND OF THE INVENTION

1. Field of the Invention

The present invention relates to a medical image processing apparatus and a medical image processing method, and more particularly to a medical image processing apparatus and a medical image processing method which can detect a protruding shape in a three-dimensional model of a living tissue within a body cavity.

2. Description of the Related Art

An endoscope system configured by including an endoscope, a medical image processing apparatus and the like is widely used in a medical field or the like. Specifically, the endoscope system is configured by including, for example, the endoscope configured with an insertion portion which is inserted into a body cavity as a living body, an objective optical system placed at a distal end portion of the insertion portion, and an image pickup portion which picks up an image of inside of the body cavity which has been imaged by the objective optical system and outputs the image as an image pickup signal, and the medical image processing apparatus which performs a process for image-displaying the image of the inside of the body cavity on a monitor or the like as a displaying portion, based on the image pickup signal. Then, based on the image of the inside of the body cavity image-displayed on the monitor or the like as the displaying portion, a user performs observation of, for example, an organ or the like as a subject within the body cavity.

Moreover, the endoscope system including the above described configuration can also pick up an image of a mucosa of the gut such as a large intestine, for example, as the subject within the body cavity. Thus, the user can comprehensively perform various observations of a color tone of the mucosa, a shape of a lesion, a microstructure of a mucous surface, for example.

Furthermore, in recent years, it is possible to generate a three-dimensional model of the subject based on two-dimensional image data depending on the image pickup signal of the image of the subject picked up by the endoscope. For example, an endoscope apparatus as described in Japanese Patent Application Laid-Open Publication No. 11-337845 has been proposed.

On the other hand, as a method of detecting a lesion area such as a polyp in the three-dimensional model, for example, a method described in US Patent Application Publication No. 2003/0223627 has been proposed in which the lesion area in the three-dimensional model can be detected by performing evaluation of a shape of the three-dimensional model while using shape feature values based on curvatures such as ShapeIndex and Curvedness.

SUMMARY OF THE INVENTION

A first medical image processing apparatus in the present invention includes a three-dimensional model estimating section for estimating, based on an inputted two-dimensional image of an image of a living tissue within a body cavity, a three-dimensional model of the living tissue, a shape feature value calculating section for calculating shape feature values of respective voxels included in the three-dimensional model of the living tissue, a three-dimensional shape extracting section for extracting a first voxel group whose three-dimensional model has been estimated as a predetermined shape, in the respective voxels included in the three-dimensional model of the living tissue, based on the shape feature values, and a protruding shape detecting section for detecting the first voxel group as a voxel group configuring a protruding shape in the three-dimensional model of the living tissue.

A second medical image processing apparatus in the present invention, preferably, further includes a region detecting section for detecting a visible region and an invisible region in the inputted two-dimensional image.

In a third medical image processing apparatus in the present invention, preferably, the region detecting section obtains information on a line structure in the inputted two-dimensional image and also detects a boundary portion based on the information on the line structure, and thereby determines that the visible region and the invisible region are separated by a boundary of the boundary portion.

In a fourth medical image processing apparatus in the present invention, preferably, the three-dimensional model estimating section further adds voxels at predetermined positions in the invisible region based on respective voxels estimated in the visible region.

In a fifth medical image processing apparatus in the present invention, preferably, the predetermined positions are positions which are symmetric with respect to the boundary portion detected by the region detecting section, from the respective voxels estimated in the visible region.

In a sixth medical image processing apparatus in the present invention, preferably, the predetermined shape is a convex shape.

In a seventh medical image processing apparatus in the present invention, preferably, the three-dimensional shape extracting section further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the second voxel group and the third voxel group exist within a predetermined range, the three-dimensional shape extracting section extracts the second voxel group and the third voxel group as the first voxel group.

In an eighth medical image processing apparatus in the present invention, preferably, the three-dimensional shape extracting section further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the third voxel group existing in the invisible region and the second voxel group existing in the visible region exist within a predetermined range, the three-dimensional shape extracting section extracts the second voxel group and the third voxel group as the first voxel group.

In a ninth medical image processing apparatus in the present invention, preferably, the three-dimensional shape extracting section further determines whether or not the third voxel group existing in the invisible region and the second voxel group existing in the visible region exist within the predetermined range, based on a distance between average coordinates of the second voxel group and average coordinates of the third voxel group.

In a tenth medical image processing apparatus in the present invention, preferably, the shape feature value calculating section further calculates the shape feature values only in respective voxels in the visible region.

In an eleventh medical image processing apparatus in the present invention, preferably, based on peripheral region voxel information which is information on voxels existing in a peripheral region of one voxel, the shape feature value calculating section calculates the shape feature values of the one voxel, and if the shape feature value calculating section has sensed that a voxel including the boundary portion exists within the peripheral region, the shape feature value calculating section reduces peripheral voxel information used for calculating the shape feature values of the one voxel.

A first medical image processing method in the present invention includes a three-dimensional model estimating step of estimating, based on an inputted two-dimensional image of an image of a living tissue within a body cavity, a three-dimensional model of the living tissue, a shape feature value calculating step of calculating shape feature values of respective voxels included in the three-dimensional model of the living tissue, a three-dimensional shape extracting step of extracting a first voxel group whose three-dimensional model has been estimated as a predetermined shape, in the respective voxels included in the three-dimensional model of the living tissue, based on the shape feature values, and a protruding shape detecting step of detecting the first voxel group as a voxel group configuring a protruding shape in the three-dimensional model of the living tissue.

A second medical image processing method in the present invention, preferably, further includes a region detecting step of detecting a visible region and an invisible region in the inputted two-dimensional image.

In a third medical image processing method in the present invention, preferably, the region detecting step obtains information on a line structure in the inputted two-dimensional image and also detects a boundary portion based on the information on the line structure, and thereby determines that the visible region and the invisible region are separated by a boundary of the boundary portion.

In a fourth medical image processing method in the present invention, preferably, the three-dimensional model estimating step further adds voxels at predetermined positions in the invisible region based on respective voxels estimated in the visible region.

In a fifth medical image processing method in the present invention, preferably, the predetermined positions are positions which are symmetric with respect to the boundary portion detected by the region detecting step, from the respective voxels estimated in the visible region.

In a sixth medical image processing method in the present invention, preferably, the predetermined shape is a convex shape.

In a seventh medical image processing method in the present invention, preferably, the three-dimensional shape extracting step further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the second voxel group and the third voxel group exist within a predetermined range, the three-dimensional shape extracting step extracts the second voxel group and the third voxel group as the first voxel group.

In an eighth medical image processing method in the present invention, preferably, the three-dimensional shape extracting step further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the third voxel group existing in the invisible region and the second voxel group existing in the visible region exist within a predetermined range, the three-dimensional shape extracting step extracts the second voxel group and the third voxel group as the first voxel group.

In a ninth medical image processing method in the present invention, preferably, the three-dimensional shape extracting step further determines whether or not the third voxel group existing in the invisible region and the second voxel group existing in the visible region exist within the predetermined range, based on a distance between average coordinates of the second voxel group and average coordinates of the third voxel group.

In a tenth medical image processing method in the present invention, preferably, the shape feature value calculating step further calculates the shape feature values only in respective voxels in the visible region.

In an eleventh medical image processing method in the present invention, preferably, based on peripheral region voxel information which is information on voxels existing in a peripheral region of one voxel, the shape feature value calculating step calculates the shape feature values of the one voxel, and if the shape feature value calculating step has sensed that a voxel including the boundary portion exists within the peripheral region, the shape feature value calculating step reduces peripheral voxel information used for calculating the shape feature values of the one voxel.

DETAILED DESCRIPTION OF THE PREFERRED EMBODIMENT(S)

Hereinafter, embodiments of the present invention will be described with reference to the drawings.

First Embodiment

Figure 1:
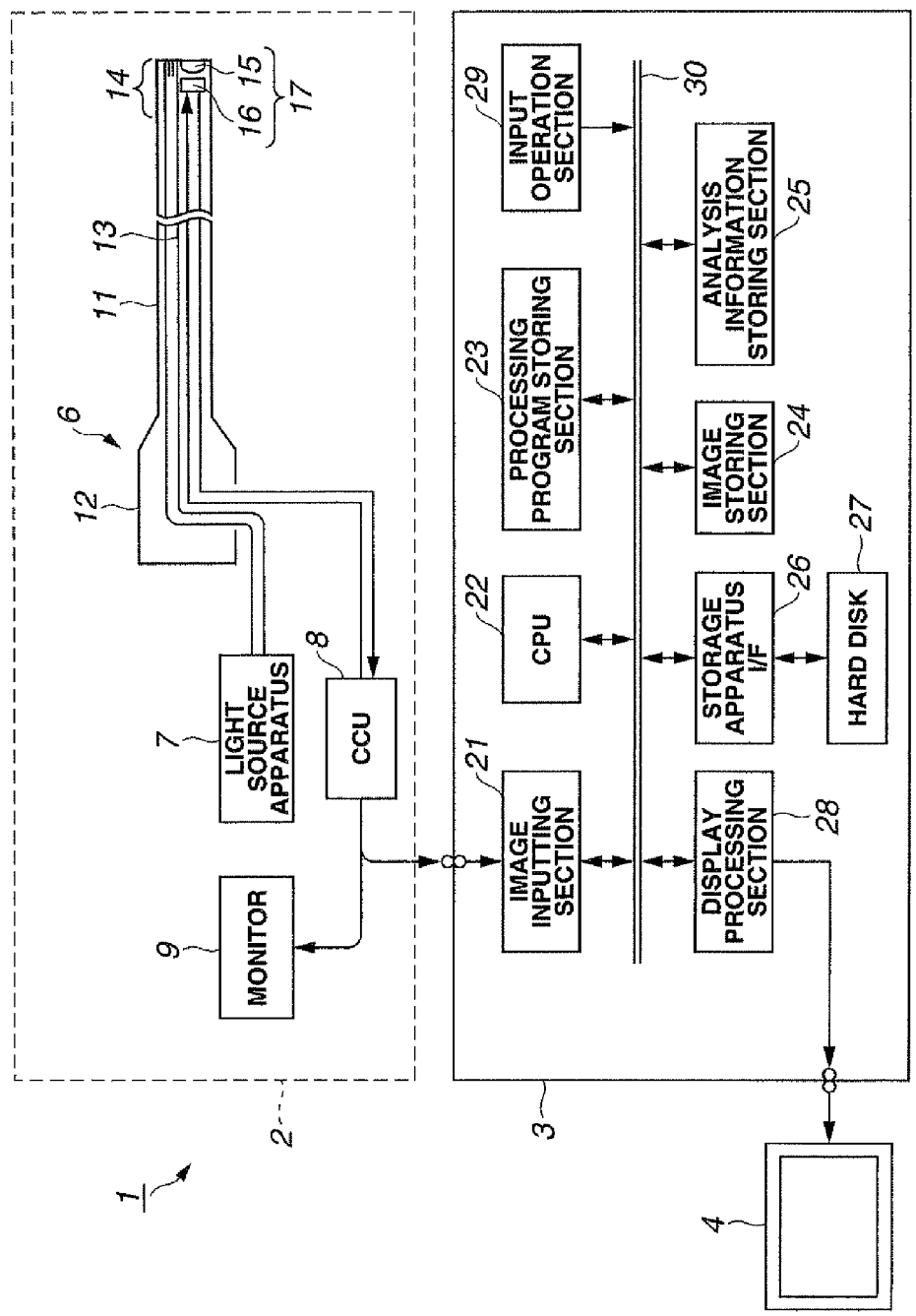
FIG. 1 is a diagram showing an example of an overall configuration of an endoscope system in which a medical image processing apparatus according to an embodiment of the present invention is used.
Figure 2:
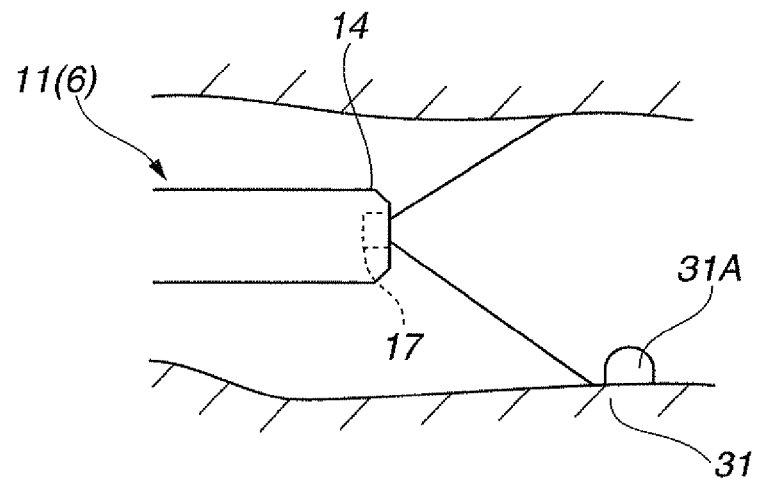
FIG. 2 is a schematic diagram showing a state in the case where the endoscope of FIG. 1 has been inserted into a tubular organ.
Figure 3:
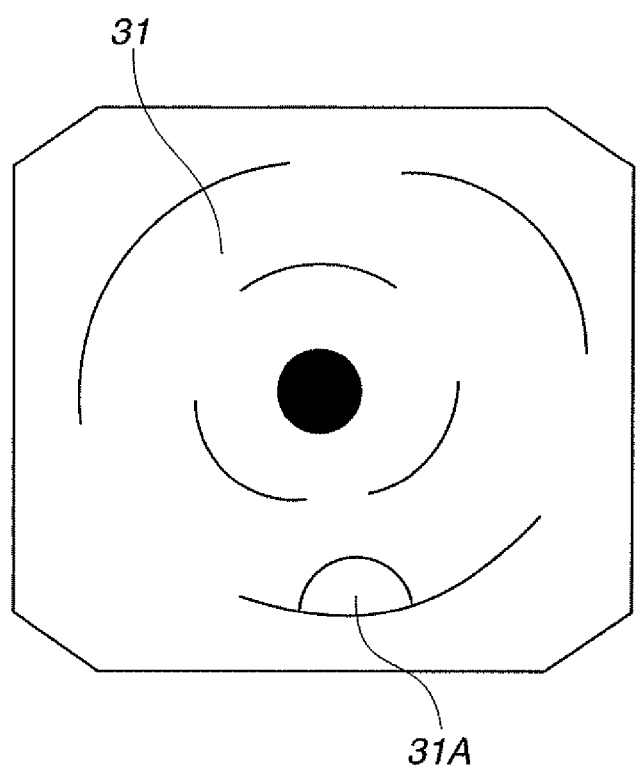
FIG. 3 is a schematic diagram showing an image of the tubular organ and a living tissue picked up by the endoscope in the state of FIG. 2.
Figure 4:
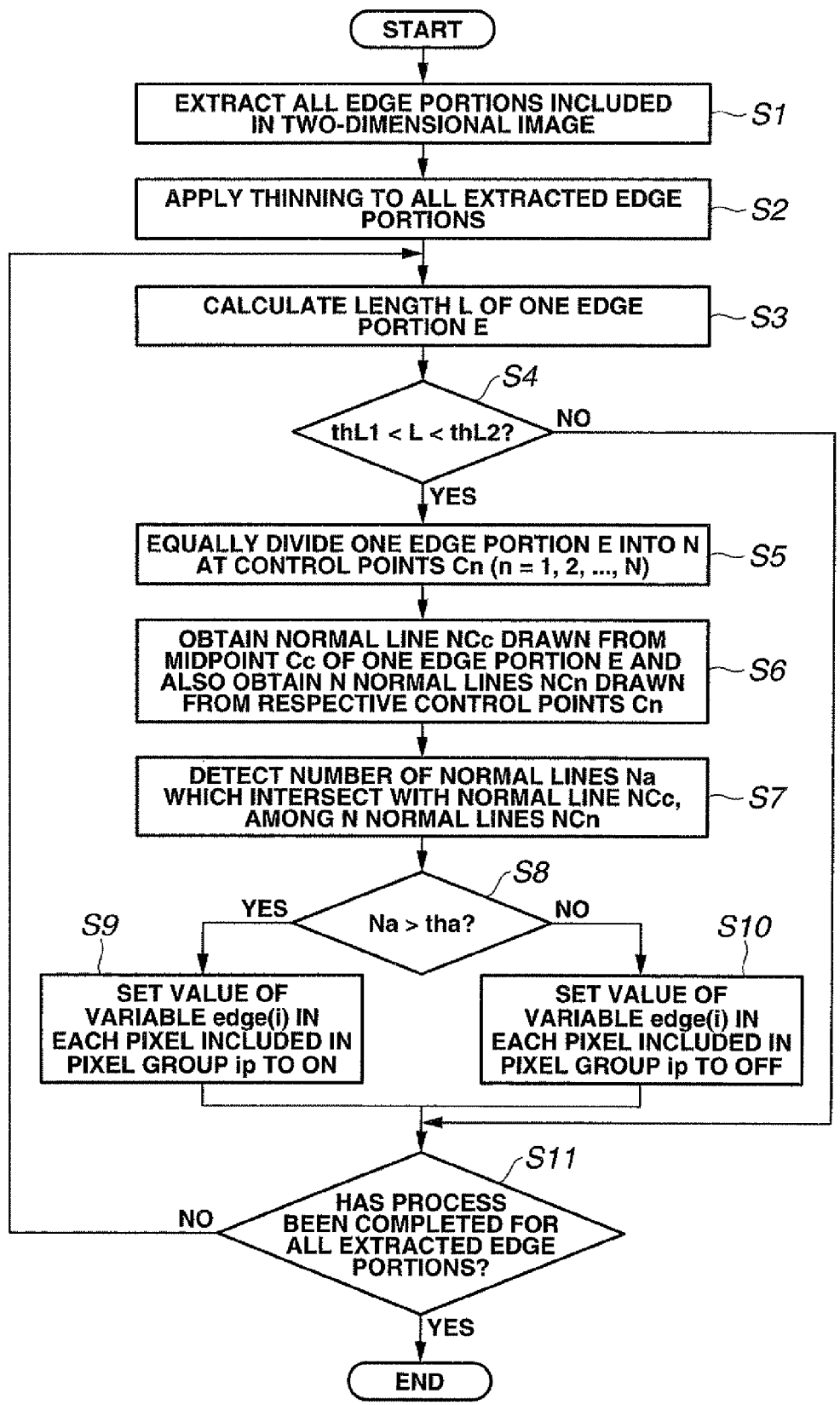
FIG. 4 is a flowchart showing a procedure of a process performed by the medical image processing apparatus of FIG. 1 in the case where an edge portion in a two-dimensional image of the image of the living tissue is extracted in a first embodiment.
Figure 5:
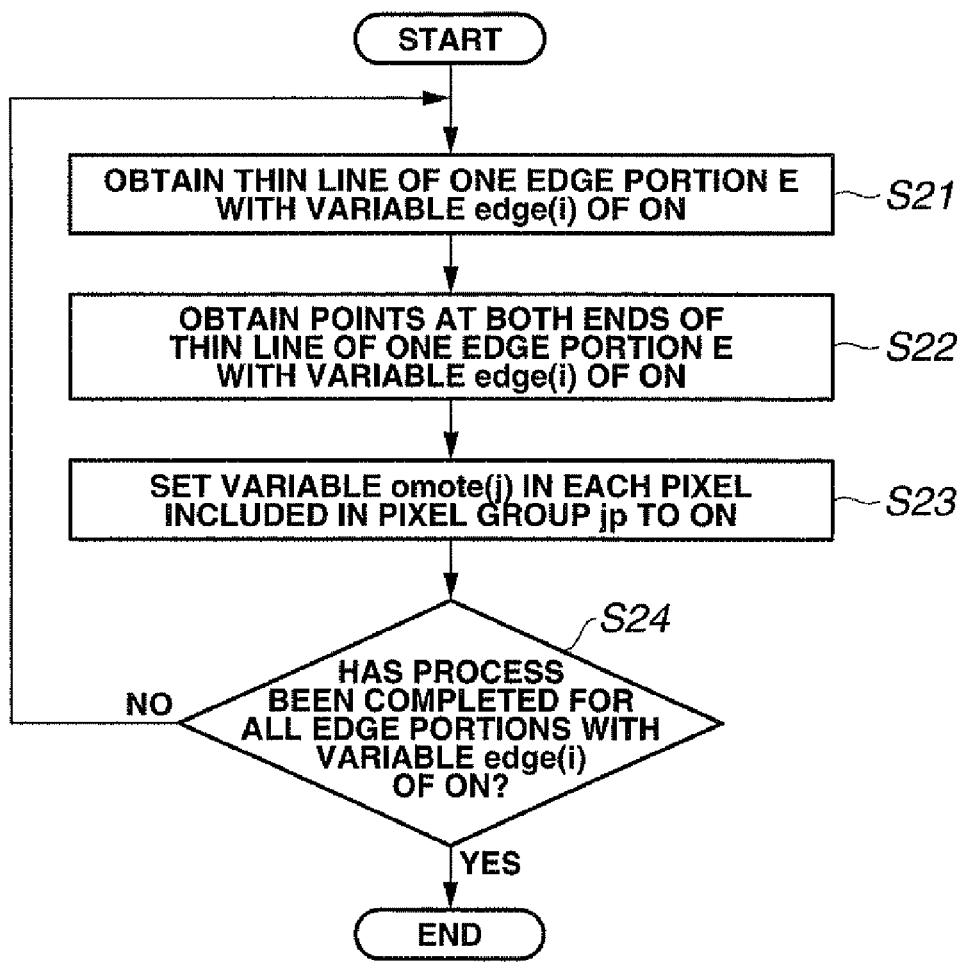
FIG. 5 is a flowchart showing a procedure of a process performed by the medical image processing apparatus of FIG. 1 in the case where a surface portion in the two-dimensional image of the image of the living tissue is extracted in the first embodiment.
Figure 6:
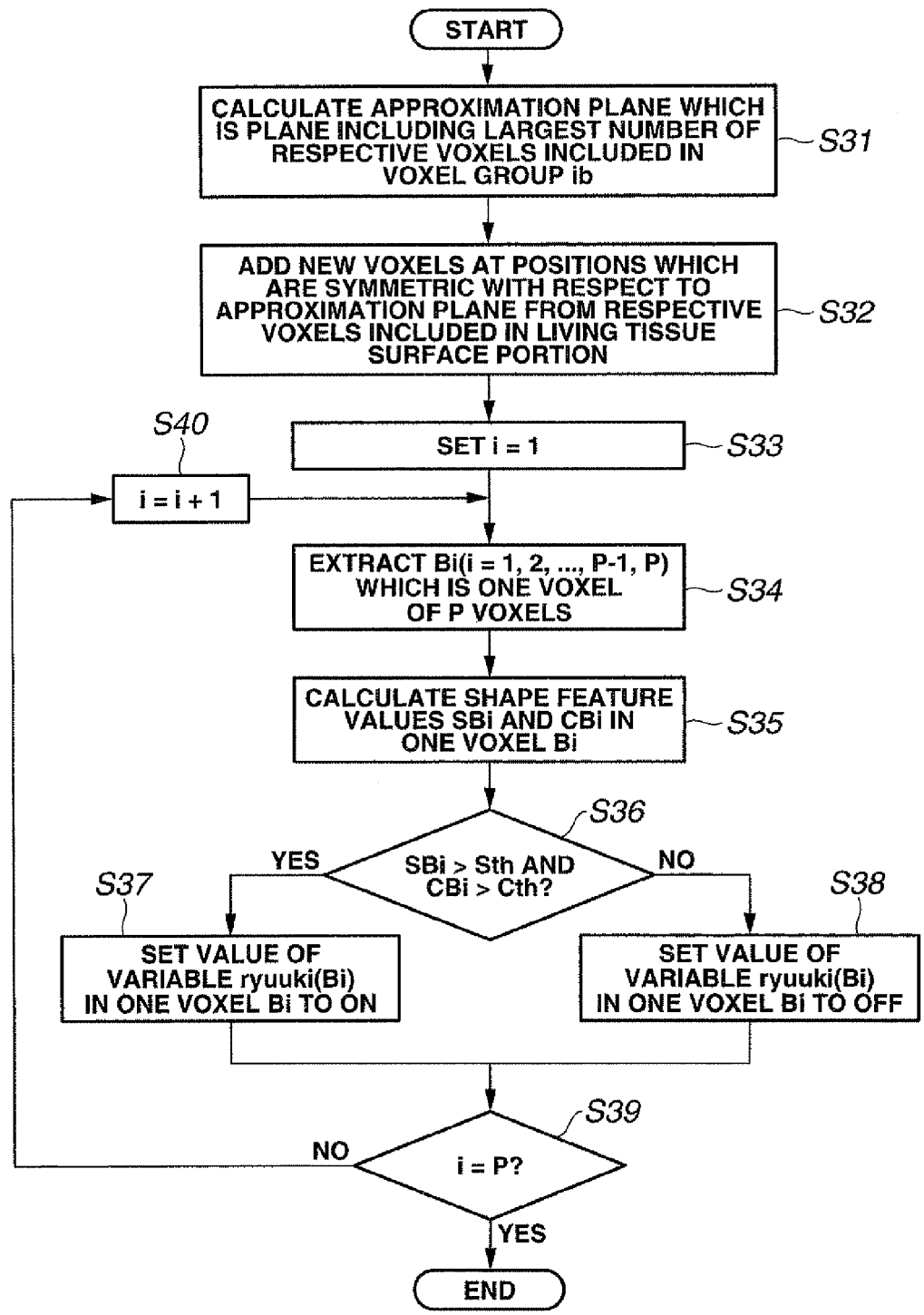
FIG. 6 is a flowchart showing a procedure of a process performed by the medical image processing apparatus of FIG. 1 in the case where a protruding shape in a three-dimensional model of the living tissue is detected in the first embodiment.
Figure 7:
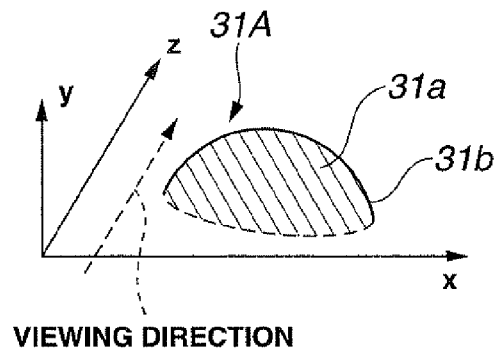
FIG. 7 is a diagram showing an example of the three-dimensional model of the living tissue estimated by the medical image processing apparatus of FIG. 1.
Figure 8:
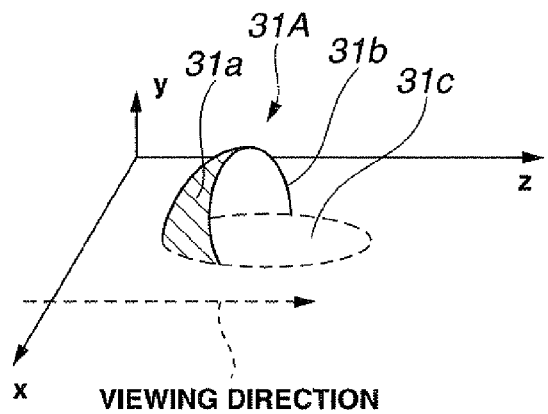
FIG. 8 is a diagram of the three-dimensional model of the living tissue of FIG. 7 in the case of being seen from another direction.
Figure 9:
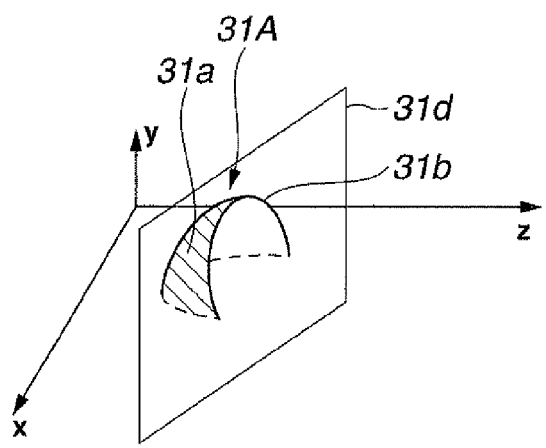
FIG. 9 is a diagram showing a boundary approximation plane in the three-dimensional model of the living tissue of FIGS. 7 and 8.
Figure 10:
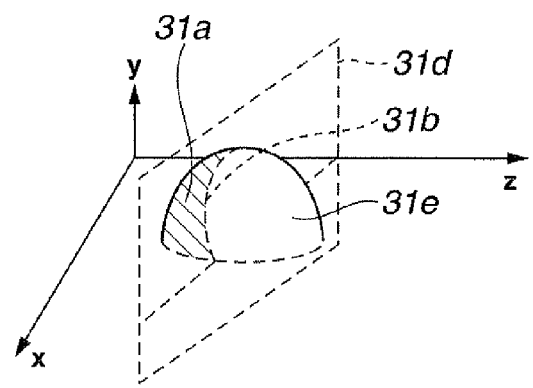
FIG. 10 is a diagram showing an example in the case where a mirror image based on the boundary approximation plane shown in FIG. 9 has been added in the three-dimensional model of the living tissue of FIGS. 7 and 8.

FIGS. 1 to 10 relate to a first embodiment of the present invention. FIG. 1 is a diagram showing an example of an overall configuration of an endoscope system in which a medical image processing apparatus according to the present embodiment is used. FIG. 2 is a schematic diagram showing a state in the case where the endoscope of FIG. 1 has been inserted into a tubular organ. FIG. 3 is a schematic diagram showing an image of the tubular organ and a living tissue picked up by the endoscope in the state of FIG. 2. FIG. 4 is a flowchart showing a procedure of a process performed by the medical image processing apparatus of FIG. 1 in the case where an edge portion in a two-dimensional image of the image of the living tissue is extracted in the first embodiment. FIG. 5 is a flowchart showing a procedure of a process performed by the medical image processing apparatus of FIG. 1 in the case where a surface portion in the two-dimensional image of the image of the living tissue is extracted in the first embodiment. FIG. 6 is a flowchart showing a procedure of a process performed by the medical image processing apparatus of FIG. 1 in the case where a protruding shape in a three-dimensional model of the living tissue is detected in the first embodiment. FIG. 7 is a diagram showing an example of the three-dimensional model of the living tissue estimated by the medical image processing apparatus of FIG. 1. FIG. 8 is a diagram of the three-dimensional model of the living tissue of FIG. 7 in the case of being seen from another direction. FIG. 9 is a diagram showing a boundary approximation plane in the three-dimensional model of the living tissue of FIGS. 7 and 8. FIG. 10 is a diagram showing an example in the case where a mirror image based on the boundary approximation plane shown in FIG. 9 has been added in the three-dimensional model of the living tissue of FIGS. 7 and 8.

As shown in FIG. 1, a substantial part of an endoscope system 1 is configured with a medical observing apparatus 2 which picks up a subject and also outputs a two-dimensional image of an image of the subject, a medical image processing apparatus 3 which is configured with a personal computer or the like and performs image processing for a video signal of the two-dimensional image outputted from the medical observing apparatus 2 and also outputs the video signal for which the image processing has been performed, as an image signal, and a monitor 4 which displays an image based on the image signal outputted from the medical image processing apparatus 3.

Moreover, a substantial part of the medical observing apparatus 2 is configured with an endoscope 6 which is inserted into a body cavity and also picks up a subject within the body cavity and outputs the subject as an image pickup signal, a light source apparatus 7 which supplies illumination light for illuminating the subject to be picked up by the endoscope 6, a camera control unit (hereinafter abbreviated as "CCU") 8 which performs various controls for the endoscope 6, also performs signal processing for the image pickup signal outputted from the endoscope 6, and outputs the image pickup signal as the video signal of the two-dimensional image, and a monitor 9 which image-displays the image of the subject picked up by the endoscope 6, based on the video signal of the two-dimensional image outputted from the CCU 8.

The endoscope 6 is configured with an insertion portion 11 which is inserted into the body cavity and an operation portion 12 provided on a proximal end side of the insertion portion 11. Moreover, a light guide 13 for transmitting the illumination light supplied by the light source apparatus 7 is inserted through a portion from the proximal end side within the insertion portion 11 to a distal end portion 14 on a distal end side within the insertion portion 11.

A distal end side of the light guide 13 is placed at the distal end portion 14 of the endoscope 6, and also a rear end side of the light guide 13 is connected to the light source apparatus 7. Since the light guide 13 has such a configuration, the illumination light supplied by the light source apparatus 7 is transmitted by the light guide 13 and subsequently outputted from an illumination window (not shown) provided on a distal end surface at the distal end portion 14 of the insertion portion 11. Then, since the illumination light is outputted from the illumination window (not shown), a living tissue or the like as the subject is illuminated.

At the distal end portion 14 of the endoscope 6 are provided an objective optical system 15 attached to an observation window (not shown) adjacent to the illumination window (not shown), and an image pickup portion 17 which is placed at an imaging position of the objective optical system 15 and has an image pickup device 16 configured with, for example, a CCD (charge-coupled device) and the like. With such a configuration, the image of the subject imaged by the objective optical system 15 is picked up by the image pickup device 16 and subsequently outputted as the image pickup signal.

The image pickup device 16 is connected to the CCU 8 via a signal line. Then, the image pickup device 16 is driven based on a driving signal outputted from the CCU 8, and also outputs the image pickup signal depending on the image of the picked-up subject, to the CCU 8.

Moreover, the image pickup signal inputted to the CCU 8 is applied with the signal processing in a signal processing circuit (not shown) provided within the CCU 8, and thereby converted and outputted as the video signal of the two-dimensional image. The video signal of the two-dimensional image outputted from the CCU 8 is outputted to the monitor 9 and the medical image processing apparatus 3. Thereby, on the monitor 9, the image of the subject based on the video signal outputted from the CCU 8 is displayed as the two-dimensional image.

The medical image processing apparatus 3 has an image inputting section 21 which performs A/D conversion for the video signal of the two-dimensional image outputted from the medical observing apparatus 2 and outputs the video signal, a CPU 22 as a central processing unit which performs the image processing for the video signal outputted from the image inputting section 21, a processing program storing section 23 in which a processing program related to the image processing has been written, an image storing section 24 which stores the video signal outputted from the image inputting section 21 and the like, and an information storing section 25 which stores calculation results in the image processing performed by the CPU 22.

Moreover, the medical image processing apparatus 3 has a storage apparatus interface 26, a hard disk 27 as a storage apparatus which stores image data as a result of the image processing in the CPU 22 via the storage apparatus interface 26, a display processing section 28 which performs display processing for image-displaying the image data on the monitor 4 based on the image data as the image processing result in the CPU 22, and also outputs the image data for which the display processing has been performed, as the image signal, and an input operation section 29 configured with a keyboard and the like with which a user can input parameters in the image processing performed by the CPU 22 and operation instructions to the medical image processing apparatus 3. The monitor 4 displays the image based on the image signal outputted from the display processing section 28.

It should be noted that the image inputting section 21, the CPU 22, the processing program storing section 23, the image storing section 24, the information storing section 25, the storage apparatus interface 26, the display processing section 28 and the input operation section 29 in the medical image processing apparatus 3 are connected with one another via a data bus 30.

Next, an operation of the endoscope system 1 will be described.

First, as shown in FIG. 2, the user inserts the insertion portion 11 of the endoscope 6 into a tubular organ 31 such as a large intestine, for example. Then, when the insertion portion 11 is inserted into the tubular organ 31 by the user, an image of a living tissue 31A which is a lesion area existing on an inner wall of the tubular organ 31, for example, is picked up as an image as shown in FIG. 3 by the image pickup portion 17 provided at the distal end portion 14. Then, the image of the tubular organ 31 and the living tissue 31A picked up as the image as shown in FIG. 3 by the image pickup portion 17 is outputted as the image pickup signal to the CCU 8.

The CCU 8 performs the signal processing for the image pickup signal outputted from the image pickup device 16 of the image pickup portion 17, in the signal processing circuit (not shown), and thereby converts the image pickup signal into the video signal of the two-dimensional image and outputs the video signal. Then, the monitor 9 displays the image of the tubular organ 31 and the living tissue 31A based on the video signal outputted from the CCU 8, as the two-dimensional image as shown in FIG. 3, for example. Moreover, the CCU 8 outputs the video signal of the two-dimensional image obtained by performing the signal processing for the image pickup signal outputted from the image pickup device 16 of the image pickup portion 17, to the medical image processing apparatus 3.

The video signal of the two-dimensional image outputted to the medical image processing apparatus 3 is A/D converted in the image inputting section 21, and subsequently inputted to the CPU 22.

Based on the video signal of the two-dimensional image outputted from the image inputting section 21 and the processing program written in the processing program storing section 23, the CPU 22 extracts an edge portion of the living tissue 31A in the two-dimensional image, by performing a process as described below, for example.

First, based on the video signal of the two-dimensional image outputted from the image inputting section 21, the CPU 22 extracts all edge portions included in the two-dimensional image, by applying a band-pass filter for red components of the two-dimensional image, for example (step S1 of FIG. 4).

Subsequently, the CPU 22 having a function as a region detecting section applies thinning to all the extracted edge portions (step S2 of FIG. 4), and also calculates a length L of one edge portion E among all the edge portions applied with the thinning (step S3 of FIG. 4). Furthermore, the CPU 22 determines whether or not the length L of the one edge portion E is longer than a threshold thL1 and shorter than a threshold thL2.

Then, if the CPU 22 has detected that the length L of the one edge portion E is a length equal to or shorter than the predetermined threshold thL1, or a length equal to or longer than the threshold thL2 (step S4 of FIG. 4), the CPU 22 performs a process shown at step S11 of FIG. 4 as described below. Moreover, if the CPU 22 has detected that the length L of the one edge portion E is longer than the threshold thL1 and shorter than the threshold thL2 (step S4 of FIG. 4), the CPU 22 equally divides the one edge portion B into N at control points Cn (n=1, 2, ..., N) (step S5 of FIG. 4).

Furthermore, the CPU 22 obtains a normal line NCc drawn from a midpoint Cc of the one edge portion E, and also obtains N normal lines NCn drawn from the respective control points Cn (step S6 of FIG. 4). Subsequently, the CPU 22 detects the number of normal lines Na which intersect with the normal line NCc among the N normal lines NCn (step S7 of FIG. 4).

Moreover, the CPU 22 determines whether or not the number of normal lines Na which intersect with the normal line NCc among the N normal lines NCn is larger than a threshold tha. Then, if the CPU 22 having the function as the region detecting section has detected that the number of normal lines Na which intersect with the normal line NCc is larger than the threshold tha (step S8 of FIG. 4), the CPU 22 determines that a pixel group ip included in the one edge portion E is a pixel group included in the edge portion of the living tissue 31A, and sets a value of a variable edge(i) in each pixel included in the pixel group ip to ON (step S9 of FIG. 4). Furthermore, then, if the CPU 22 has detected that the number of normal lines Na which intersect with the normal line NCc is equal to or smaller than the threshold tha (step S8 of FIG. 4), the CPU 22 determines that the pixel group ip included in the one edge portion E is not the pixel group included in the edge portion of the living tissue 31A, and sets the value of the variable edge(i) in each pixel included in the pixel group ip to OFF (step S10 of FIG. 4).

In other words, the CPU 22 having the function as the region detecting section determines that a visible region and an invisible region in the two-dimensional image are separated by a boundary which is the pixel group with the value of the variable edge(i) of ON, by performing the above described process.

The CPU 22 determines whether or not the process has been completed for all the extracted edge portions. Then, if the CPU 22 has detected that the process has not been completed for all the extracted edge portions (step S11 of FIG. 4), the CPU 22 performs the above described process from step S3 of FIG. 4 to step S10 of FIG. 4 for another one edge portion. Moreover, if the CPU 22 has detected that the process has been completed for all the extracted edge portions (step S11 of FIG. 4), the CPU 22 completes a series of processes for extracting the edge portion of the living tissue 31A in the two-dimensional image.

Subsequently, the CPU 22 temporarily stores the value of the variable edge(i) in the pixel group ip included in each edge portion of the two-dimensional image, in the information storing section 25, as a processing result obtained by performing the series of processes for extracting the edge portion of the living tissue 31A in the two-dimensional image, as described above.

Based on the value of the variable edge(i) stored in the information storing section 25 and the processing program written in the processing program storing section 23, the CPU 22 extracts a surface portion of the living tissue 31A in the two-dimensional image by performing the above described process shown in FIG. 4, for example, and subsequently further performing a process as described below.

First, the CPU 22 obtains a thin line of the one edge portion E with the variable edge(i) of ON, based on the value of the variable edge(i) stored in the information storing section 25 (step S21 of FIG. 5). Subsequently, the CPU 22 obtains points at both ends of the thin line of the one edge portion E with the variable edge(i) of ON (step S22 of FIG. 5).

Then, the CPU 22 regards a pixel group jp surrounded by the thin line of the one edge portion E with the variable edge(i) of ON and a line connecting the points at the both ends of the thin line obtained at step S22 of FIG. 5 as described above, as the visible region in the two-dimensional image of the living tissue 31A, that is, as a pixel group included in the surface portion of the living tissue 31A, and sets a variable omote(j) in each pixel included in the pixel group jp to ON (step S23 of FIG. 5).

The CPU 22 determines whether or not the process has been completed for all the edge portions with the variable edge(i) of ON. Then, if the CPU 22 has detected that the process has not been completed for all the edge portions with the variable edge(i) of ON (step S24 of FIG. 5), the CPU 22 performs the above described process from step S21 of FIG. 5 to step S23 of FIG. 5 for another one edge portion. Moreover, if the CPU 22 has detected that the process has been completed for all the extracted edge portions with the variable edge (i) of ON (step S24 of FIG. 5), the CPU 22 completes a series of processes for extracting the surface portion of the living tissue 31A in the two-dimensional image.

Subsequently, the CPU 22 temporarily stores the value of the variable omote(j) in the pixel group jp included in each surface portion of the two-dimensional image, in the information storing section 25, as a processing result obtained by performing the series of processes for extracting the surface portion of the living tissue 31A in the two-dimensional image, as described above.

Then, the CPU 22 having a function as a three-dimensional model estimating section performs image processing for obtaining image data required for estimating a three-dimensional model of the tubular organ 31 and the living tissue 31A based on luminance information in the video signal of the two-dimensional image outputted from the image inputting section 21, by a process such as geometric conversion. In other words, the CPU 22 generates a voxel corresponding to each pixel in the two-dimensional image and also obtains the voxel as the image data for estimating the three-dimensional model, by the process such as the geometric conversion. That is to say, the pixel group ip and the pixel group jp are converted as a voxel group ib and a voxel group jb by the above described process.

The CPU 22 obtains data on a living tissue surface portion 31a which is a plane including the voxel group jb with the variable omote(j) of ON, and data on a living tissue boundary portion 31b which is a plane including the voxel group ib with the variable edge(i) of ON, as the image data for estimating the three-dimensional model of the living tissue 31A shown in FIG. 3, by the above described process. Thereby, if a z-axis direction is a viewing direction during observation with the endoscope 6, for example, the living tissue 31A is estimated as the three-dimensional model having a shape as shown in FIG. 7.

Incidentally, the living tissue 31A estimated as the three-dimensional model having the shape as shown in FIG. 7 by performing the above described process has an invisible region 31c in a region, for example, as shown in FIG. 8, in the case of being seen from an x-axis direction. Based on the data on the living tissue surface portion 31a and the data on the living tissue boundary portion 31b, the CPU 22 further estimates a three-dimensional model of the invisible region 31c of the living tissue 31A and also detects a protruding shape in the estimated three-dimensional model of the living tissue 31A, by performing a process as described below.

First, based on the processing program written in the processing program storing section 23 and the data on the living tissue boundary portion 31b, the CPU 22 calculates an approximation plane 31d which is a plane including the largest number of respective voxels included in the voxel group ib of the living tissue boundary portion 31b and is a plane, for example, as shown in FIG. 9 (step S31 of FIG. 6).

Next, based on the data on the living tissue surface portion 31a, the CPU 22 adds new voxels at predetermined positions in the invisible region 31c. Specifically, based on the data on the living tissue surface portion 31a, the CPU 22 adds the new voxels at positions which are symmetric with respect to the approximation plane 31d from respective voxels included in the living tissue surface portion 31a, as the predetermined positions (step S32 of FIG. 6). By performing the above described process by the CPU 22, the living tissue 31A is estimated as a three-dimensional model having the living tissue surface portion 31a and a living tissue rear surface portion 31e generated as a mirror image of the living tissue surface portion 31a, for example, as shown in FIG. 10. That is to say, the above described three-dimensional model of the invisible region 31c of the living tissue 31A is estimated as the living tissue rear surface portion 31e.

Subsequently, the CPU 22 farther performs a process as described below for respective P voxels which are all the voxels obtained as the image data for estimating the three-dimensional model of the tubular organ 31 and the living tissue 31A.

After setting a variable i to 1 (step S33 of FIG. 6), the CPU 22 having a function as a shape feature value calculating section extracts Bi (i=1, 2, ..., P−1, P) which is one voxel of the P voxels (step S34 of FIG. 6), and also calculates a ShapeIndex value SBi and a Curvedness value CBi as shape feature values in the one voxel Bi (step S35 of FIG. 6).

It should be noted that the above described ShapeIndex value and Curvedness value can be calculated, by using a method similar to the method described in US Patent Application Publication No. 2003/0223627, for example. Thus, in the present embodiment, a description of a method of calculating the ShapeIndex value and the Curvedness value in the one voxel Bi is omitted.

Furthermore, the CPU 22 having a function as a three-dimensional shape extracting section performs comparison between the ShapeIndex value SBi and a preset threshold of the ShapeIndex value, Sth, and also performs comparison between the Curvedness value CBi and a preset threshold of the Curvedness value, Cth. In other words, by performing the above described process, the CPU 22 performs a process of extracting a voxel group whose three-dimensional model has been estimated as a convex shape, as a process for detecting whether or not the living tissue 31A is the protruding shape. It should be noted that, in a series of processes shown in FIG. 6, in order to detect the living tissue 31A having the convex shape as the protruding shape, it is assumed that the threshold Sth has been set to 0.9 and the threshold Cth has been set to 0.2, for example.

Then, if the CPU 22 having a function as a protruding shape detecting section has detected that the ShapeIndex value SBi is larger than the threshold Sth and the Curvedness value CBi is larger than the threshold Cth (step S36 of FIG. 6), the CPU 22 determines that the one voxel Bi is a voxel configuring a part of the protruding shape, and sets a value of a variable ryuuki(Bi) in the one voxel Bi to ON (step S37 of FIG. 6).

Moreover, if the CPU 22 has detected that the ShapeIndex value SBi is equal to or smaller than the threshold Sth, or the Curvedness value CBi is equal to or smaller than the threshold Cth (step S36 of FIG. 6), the CPU 22 determines that the one voxel Bi is not the voxel configuring a part of the protruding shape, and sets the value of the variable ryuuki(Bi) in the one voxel Bi to OFF (step S38 of FIG. 6).

Subsequently, the CPU 22 determines whether or not the above described process has been performed for all the P voxels, that is, whether or not the variable i=P.

Then, if the CPU 22 has sensed that i is not P (step S39 of FIG. 6), the CPU 22 performs a process of adding 1 to the variable i (step S40 of FIG. 6) and subsequently performs the above described process shown from step S34 to step S39 of FIG. 6 again.

And, if the CPU 22 has sensed that i=P (step S39 of FIG. 6), the CPU 22 completes a series of processes for detecting the protruding shape in the three-dimensional model of the living tissue 31A.

Then, for the display processing section 28, the CPU 22 performs a control such as superimposing a character string, coloring or the like for indicating that the living tissue 31A is the protruding shape upon the three-dimensional model, for example, in the three-dimensional model having the voxel with the value of ryuuki(Bi) of ON. Thereby, on the monitor 4, the three-dimensional model of the tubular organ 31 and the living tissue 31A is image-displayed so that the user can easily find the living tissue 31A having the protruding shape.

Moreover, based on a position of each voxel with the value of ryuuki(Bi) of ON, the CPU 22 may detect each pixel on the two-dimensional image existing at a position corresponding to the position of the each voxel, and also may perform a control such as superimposing the character string, the coloring or the like for indicating that the living tissue 31A is the protruding shape upon the two-dimensional image having the each pixel, for the display processing section 28.

The medical image processing apparatus 3 of the present embodiment can prevent the user from overlooking the lesion area such as a polyp, by performing a series of processes as described above, and thereby can reduce a burden on the user.

Second Embodiment

Figure 11:
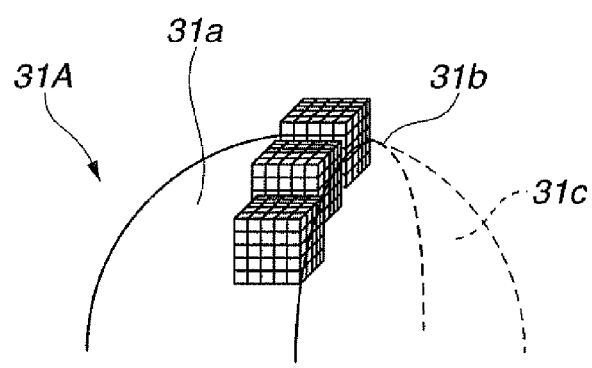
FIG. 11 is a diagram showing an example of a summary of the process performed by the medical image processing apparatus of FIG. 1 in the case where the protruding shape in the three-dimensional model of the living tissue is detected in a second embodiment.
Figure 12:
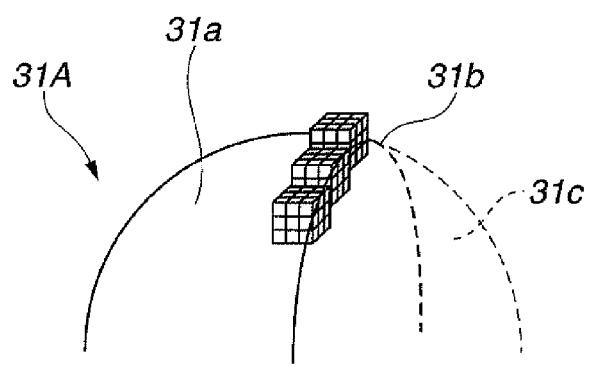
FIG. 12 is a diagram showing an example, which is different from FIG. 11, of the summary of the process performed by the medical image processing apparatus of FIG. 1 in the case where the protruding shape in the three-dimensional model of the living tissue is detected in the second embodiment.

FIGS. 11 and 12 relate to a second embodiment of the present invention. It should be noted that a detailed description of a portion having a configuration similar to that of the first embodiment is omitted. Moreover, the same reference character is used for a component similar to that of the first embodiment and a description thereof is omitted. Furthermore, the configuration of the endoscope system 1 used in the present embodiment is similar to that of the first embodiment.

FIG. 11 is a diagram showing an example of a summary of the process performed by the medical image processing apparatus of FIG. 1 in the case where the protruding shape in the three-dimensional model of the living tissue is detected in the second embodiment. FIG. 12 is a diagram showing an example, which is different from FIG. 11, of the summary of the process performed by the medical image processing apparatus of FIG. 1 in the case where the protruding shape in the three-dimensional model of the living tissue is detected in the second embodiment.

The ShapeIndex value and the Curvedness value as the shape feature values calculated during the series of processes described in an explanation of the first embodiment are values calculated based on two values of a Gaussian curvature and a mean curvature. Thus, the CPU 22 may perform the process by calculating the two values of the Gaussian curvature and the mean curvature as the shape feature values, instead of two values of the ShapeIndex value and the Curvedness value. Then, in that case, the CPU 22 performs a process with contents described below, as a process corresponding to the process shown at step S35 of FIG. 6 described in the first embodiment.

The CPU 22 having the function as the shape feature value calculating section calculates a local plane equation of a local region including a group of M×M×M voxels including a first voxel, for example, as peripheral voxel information which is information on voxels existing in a peripheral region of one voxel. Then, the CPU 22 having the function as the shape feature value calculating section calculates the Gaussian curvature and the mean curvature of the first voxel included in the group of M×M×M voxels based on the peripheral voxel information.

Specifically, as shown in FIG. 11, the CPU 22 calculates the local plane equation of the local region including a group of 5×5×5 voxels including a desired first voxel, for example, as the peripheral voxel information, and also calculates the Gaussian curvature and the mean curvature of the desired first voxel based on the peripheral voxel information.

Moreover, if the CPU 22 having the function as the shape feature value calculating section has sensed that at least one voxel in the respective voxels included in the voxel group ib with the variable edge(i) of ON is included within the local region, the CPU 22 further calculates the local plane equation of the local region including a group of K×K×K voxels (K<M) including a second voxel, for example, as the peripheral voxel information. Then, the CPU 22 having the function as the shape feature value calculating section calculates the Gaussian curvature and the mean curvature of the second voxel included in the group of K×K×K voxels based on the peripheral voxel information.

Specifically, as shown in FIG. 12, the CPU 22 calculates the local plane equation of the local region including a group of 3×3×3 voxels including a desired second voxel, for example, as the peripheral voxel information, and also calculates the Gaussian curvature and the mean curvature of the desired second voxel based on the peripheral voxel information.

The CPU 22 can extract more voxels configuring a part of the protruding shape by performing the above described process. As a result, the medical image processing apparatus 3 of the present embodiment can prevent the user from overlooking the lesion area such as a polyp, and thereby can reduce the burden on the user and also improve accuracy of detecting the lesion area.

It should be noted that, in the above described process for the three-dimensional model of the living tissue 31A, the CPU 22 may perform a process of calculating only the shape feature values of proximity of the living tissue surface portion 31a and the living tissue boundary portion 31b which are the visible region in which an estimation result has relatively high reliability, without calculating the shape feature values of the invisible region 31c in which the estimation result has relatively low reliability. In that case, the medical image processing apparatus 3 of the present embodiment can detect the lesion area such as a polyp with higher accuracy.

Third Embodiment

Figure 13:
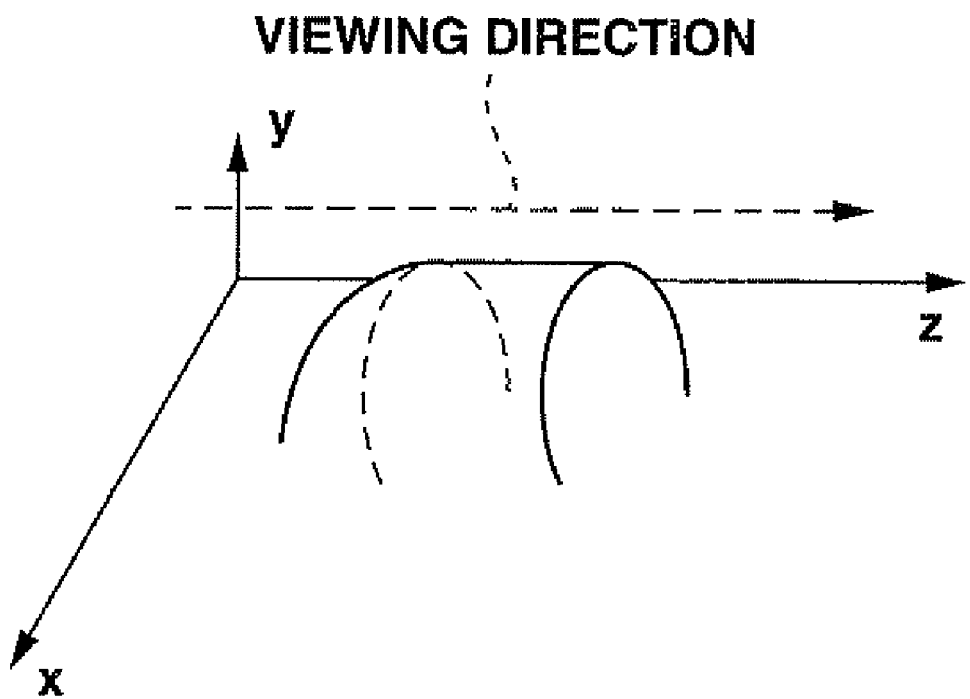
FIG. 13 is a diagram showing an example, which is different from FIGS. 7 and 8, of the three-dimensional model of the living tissue estimated by the medical image processing apparatus of FIG. 1.
Figure 14:
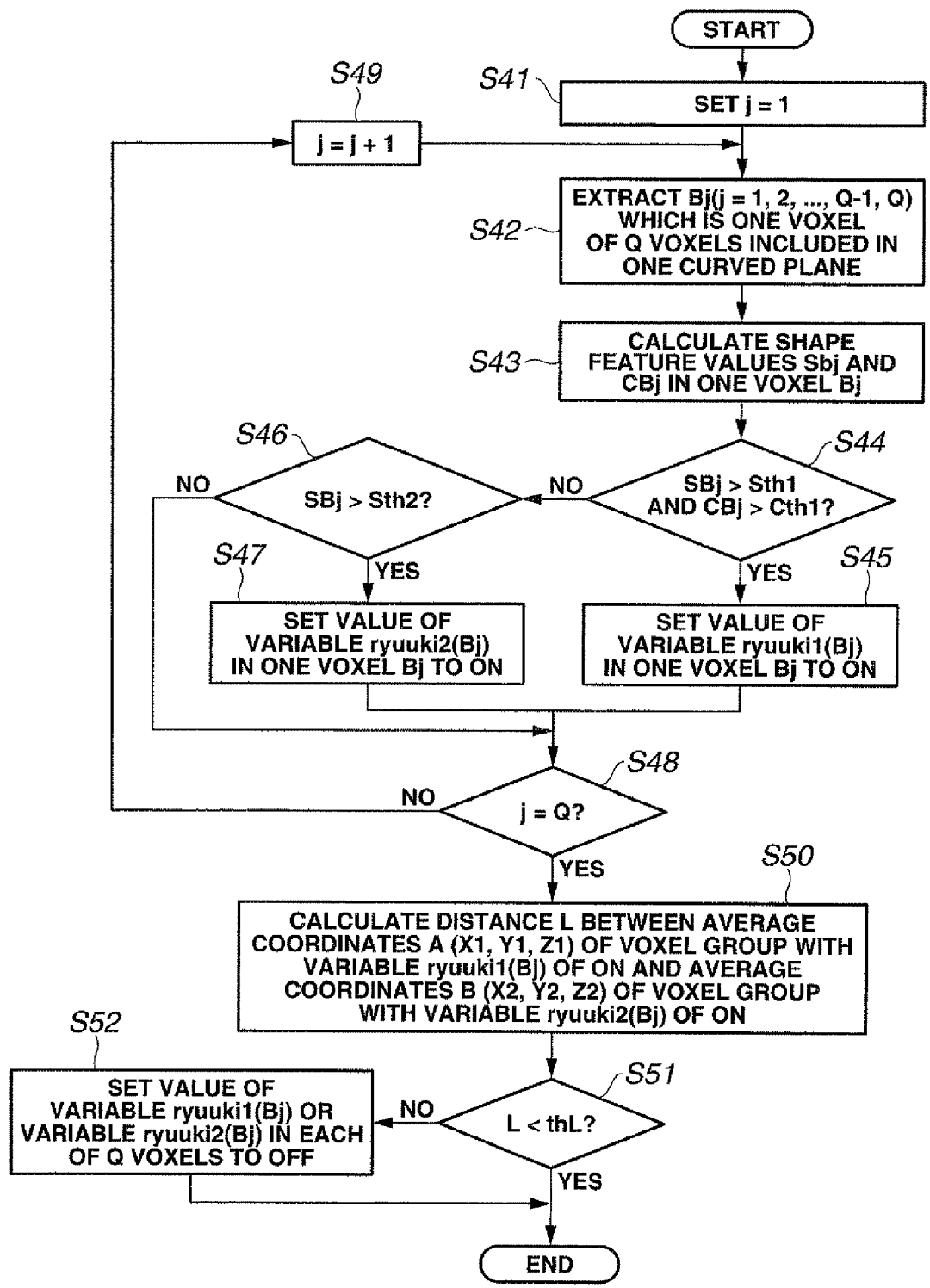
FIG. 14 is a flowchart showing the procedure of the process performed by the medical image processing apparatus of FIG. 1 in the case where the protruding shape in the three-dimensional model of the living tissue is detected in the third embodiment.
Figure 15:
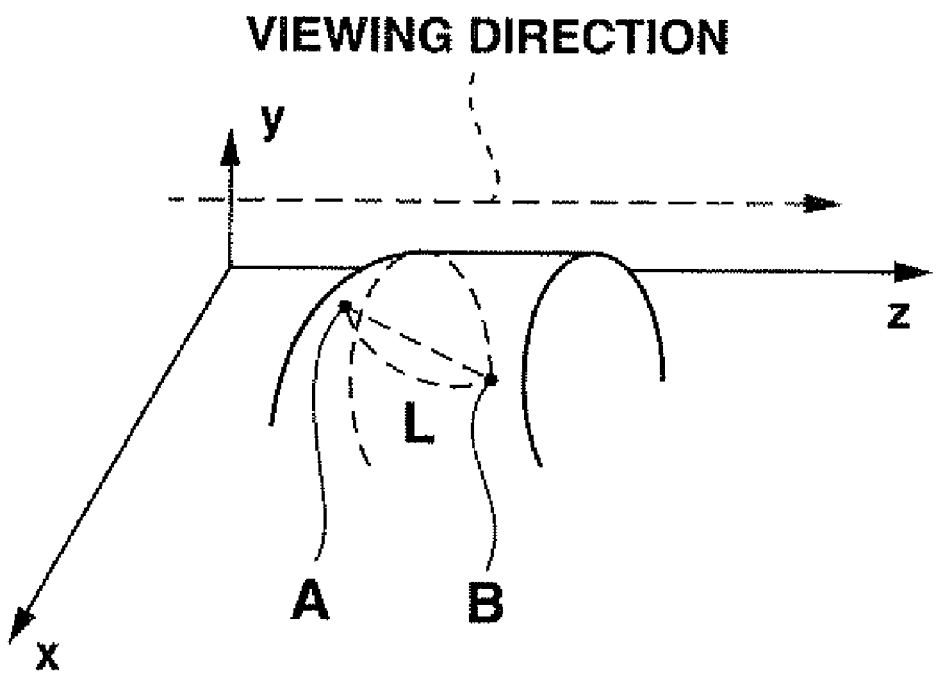
FIG. 15 is a diagram showing an example of a positional relationship between average coordinates A of a voxel group estimated as a convex shape and average coordinates B of a voxel group estimated as a roof shape, in the three-dimensional model of the living tissue of FIG. 13.

FIGS. 13, 14 and 15 relate to a third embodiment of the present invention. It should be noted that a detailed description of a portion having a configuration similar to that of the first embodiment is omitted. Moreover, the same reference character is used for a component similar to that of the first embodiment and a description thereof is omitted. Furthermore, the configuration of the endoscope system 1 used in the present embodiment is similar to that of the first embodiment.

FIG. 13 is a diagram showing an example, which is different from FIGS. 7 and 8, of the three-dimensional model of the living tissue estimated by the medical image processing apparatus of FIG. 1. FIG. 14 is a flowchart showing the procedure of the process performed by the medical image processing apparatus of FIG. 1 in the case where the protruding shape in the three-dimensional model of the living tissue is detected in the third embodiment. FIG. 15 is a diagram showing an example of a positional relationship between average coordinates A of the voxel group estimated as the convex shape and average coordinates B of a voxel group estimated as a roof shape, in the three-dimensional model of the living tissue of FIG. 13.

In the series of processes described in the explanation of the first embodiment, the CPU 22 may calculate the shape feature values of respective voxels virtually existing at the positions which are symmetric with respect to the approximation plane 31d from the respective voxels included in the living tissue surface portion 31a, for example, and also determine whether or not the protruding shape exists at the positions, based on the calculated shape feature values, without performing the process for estimating the living tissue rear surface portion 31e as the three-dimensional model of the invisible region 31c of the living tissue 31A (the process shown at step S32 of FIG. 6).

Incidentally, when the CPU 22 estimates the three-dimensional model from the two-dimensional image of the living tissue 31A, as described in the explanation of the first embodiment, the process based on the luminance information, for example, is performed. Thus, in the case where a boundary portion (edge portion) between the visible region and the invisible region in the two-dimensional image of the living tissue 31A has the luminance information which is darker than normal, the living tissue 31A can be estimated as the three-dimensional model of a shape, for example, as shown in FIG. 13, which has a roof shape in the invisible region existing in the z-axis direction as the viewing direction during the observation with the endoscope 6 (or a luminal central direction), even if an actual shape thereof is the convex shape.

In such a case, performing a process described below by the CPU 22 detects whether or not the living tissue 31A estimated as the three-dimensional model is the protruding shape.

First, after setting a variable j to 1 (step S41 of FIG. 14), the CPU 22 extracts Bj (j=1, 2, . . . , Q−1, Q) which is one voxel of Q voxels included in one curved plane in the three-dimensional model (step S42 of FIG. 14), and also calculates a ShapeIndex value SBj and a Curvedness value CBj as shape feature values in the one voxel Bj (step S43 of FIG. 14).

Furthermore, the CPU 22 performs comparison between the ShapeIndex value SBj and a preset threshold of the ShapeIndex value, Sth1, and also performs comparison between the Curvedness value CBj and a preset threshold of the Curvedness value, Cth1. In other words, by performing the above described process, the CPU 22 performs the process of extracting the voxel group whose three-dimensional model has been estimated as the convex shape, as the process for detecting whether or not the living tissue 31A is the protruding shape. It should be noted that, in a series of processes shown in FIG. 14, in order to detect the living tissue 31A having the convex shape as the protruding shape, it is assumed that the threshold Sth1 has been set to 0.9 and the threshold Cth1 has been set to 0.2, for example.

Then, if the CPU 22 has detected that the ShapeIndex value SBj is larger than the threshold Sth1 and the Curvedness value CBj is larger than the threshold Cth1 (step S44 of FIG. 14), the CPU 22 determines that the one voxel Bj is a candidate for the voxel configuring a part of the protruding shape, and sets a value of a variable ryuuki1(Bj) in the one voxel Bj to ON (step S45 of FIG. 14).

Moreover, if the CPU 22 has detected that the ShapeIndex value SBj is equal to or smaller than the threshold Sth1, or the Curvedness value CBj is equal to or smaller than the threshold Cth1 (step S44 of FIG. 14), the CPU 22 further performs comparison between the ShapeIndex value SBj and a preset threshold of the ShapeIndex value, Sth2. It should be noted that, in the series of processes shown in FIG. 14, in order to detect the living tissue 31A having the roof shape as the protruding shape, it is assumed that the threshold Sth2 has been set to 0.75, for example.

If the CPU 22 has detected that the ShapeIndex value SBj is larger than the threshold Sth2 (step S46 of FIG. 14), the CPU 22 sets a value of a variable ryuuki2(Bj) in the one voxel Bj to ON (step S47 of FIG. 14).

Subsequently, the CPU 22 determines whether or not the above described process has been performed for all the Q voxels included in the one curved plane in the three-dimensional model, that is, whether or not the variable j=Q.

Then, if the CPU 22 has sensed that j is not Q (step S48 of FIG. 14), the CPU 22 performs a process of adding 1 to the variable j (step S49 of FIG. 14) and subsequently performs the above described process shown from step S42 to step S48 of FIG. 14 again.

Moreover, if the CPU 22 has sensed that j=Q (step S48 of FIG. 14), the CPU 22 calculates a distance L, for example, between average coordinates A (X1, Y1, Z1) of a voxel group with the variable ryuuki1(Bj) of ON and average coordinates B (X2, Y2, Z2) of a voxel group with the variable ryuuki2(Bj) of ON, as shown in FIG. 15 (step S50 of FIG. 14). Subsequently, the CPU 22 determines whether or not the voxel group with the variable ryuuki1(Bj) of ON and the voxel group with the variable ryuuki2(Bj) of ON exist within a predetermined range, by performing comparison between the distance L and a threshold of the distance between A and B, thL.

If the CPU 22 has sensed that the distance L is equal to or longer than the threshold thL (step S51 of FIG. 14), the CPU 22 determines that the one curved plane having the voxel group with the variable ryuuki1(Bj) of ON and the voxel group with the variable ryuuki2(Bj) of ON is not voxels configuring the protruding shape, performs a process of setting the value of the variable ryuuki1(Bj) or the variable ryuuki2(Bj) in each of the Q voxels to OFF (step S52 of FIG. 14), and subsequently completes a series of processes. Moreover, if the CPU 22 has sensed that the distance L is shorter than the threshold thL (step S51 of FIG. 14), the CPU 22 determines that the one curved plane having the voxel group with the variable ryuuki1(Bj) of ON and the voxel group with the variable ryuuki2 (Bj) of ON is the voxels configuring the protruding shape, and completes the series of processes, leaving the value of the variable ryuuki1(Bj) or the variable ryuuki2(Bj) in each of the Q voxels as ON. Thereby, the CPU 22 can detect a polyp or the like which is the lesion area having the protruding shape, with the higher accuracy. Particularly, in addition to a lesion area protruding as a generally hemispherical shape (a polyp or the like), the CPU 22 can also detect a lesion area protruding with a generally semicylindrical area (the polyp or the like), for example, which is relatively likely to be overlooked by the user, by performing the series of processes of the present embodiment. As a result, the medical image processing apparatus 3 of the present embodiment can prevent the user from overlooking the lesion area such as a polyp, and thereby can reduce the burden on the user.

It should be noted that the present invention is not limited to the above described respective embodiments, and of course, various modifications and applications are possible in a range not deviating from the purpose of the present invention.

What is claimed is:

1. A medical image processing apparatus comprising:
    a three-dimensional model estimating section for estimating, based on an inputted two-dimensional image of an image of a living tissue within a body cavity, a three-dimensional model of the living tissue;
    a shape feature value calculating section for calculating shape feature values of respective voxels included in the three-dimensional model of the living tissue;
    a three-dimensional shape extracting section for extracting a first voxel group whose three-dimensional model has been estimated as a predetermined shape, in the respective voxels included in the three-dimensional model of the living tissue, based on the shape feature values; and
    a protruding shape detecting section for detecting the first voxel group as a voxel group configuring a protruding shape in the three-dimensional model of the living tissue.

2. The medical image processing apparatus according to claim 1, further comprising:
    a region detecting section for detecting a visible region and an invisible region in the inputted two-dimensional image.

3. The medical image processing apparatus according to claim 2, wherein the region detecting section obtains information on a line structure in the inputted two-dimensional image and also detects a boundary portion based on the information on the line structure, and thereby determines that the visible region and the invisible region are separated by a boundary of the boundary portion.

4. The medical image processing apparatus according to claim 2, wherein the three-dimensional model estimating section further adds voxels at predetermined positions in the invisible region based on respective voxels estimated in the visible region.

5. The medical image processing apparatus according to claim 4, wherein the predetermined positions are positions which are symmetric with respect to the boundary portion detected by the region detecting section, from the respective voxels estimated in the visible region.

6. The medical image processing apparatus according to claim 1, wherein the predetermined shape is a convex shape.

7. The medical image processing apparatus according to claim 1, wherein the three-dimensional shape extracting section further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the second voxel group and the third voxel group exist within a predetermined range, the three-dimensional shape extracting section extracts the second voxel group and the third voxel group as the first voxel group.

8. The medical image processing apparatus according to claim 2, wherein the three-dimensional shape extracting section further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the third voxel group existing in the invisible region and the second voxel group existing in the visible region exist within a predetermined range, the three-dimensional shape extracting section extracts the second voxel group and the third voxel group as the first voxel group.

9. The medical image processing apparatus according to claim 8, wherein the three-dimensional shape extracting section further determines whether or not the third voxel group existing in the invisible region and the second voxel group existing in the visible region exist within the predetermined range, based on a distance between average coordinates of the second voxel group and average coordinates of the third voxel group.

10. The medical image processing apparatus according to claim 2, wherein the shape feature value calculating section further calculates the shape feature values only in respective voxels in the visible region.

11. The medical image processing apparatus according to claim 3, wherein based on peripheral region voxel information which is information on voxels existing in a peripheral region of one voxel, the shape feature value calculating section calculates the shape feature values of the one voxel, and if the shape feature value calculating section has sensed that a voxel including the boundary portion exists within the peripheral region, the shape feature value calculating section reduces peripheral voxel information used for calculating the shape feature values of the one voxel.

12. A medical image processing method comprising:
    a three-dimensional model estimating step of estimating, based on an inputted two-dimensional image of an image of a living tissue within a body cavity, a three-dimensional model of the living tissue;

a shape feature value calculating step of calculating shape feature values of respective voxels included in the three-dimensional model of the living tissue;

a three-dimensional shape extracting step of extracting a first voxel group whose three-dimensional model has been estimated as a predetermined shape, in the respective voxels included in the three-dimensional model of the living tissue, based on the shape feature values; and a protruding shape detecting step of detecting the first voxel group as a voxel group configuring a protruding shape in the three-dimensional model of the living tissue.

13. The medical image processing method according to claim 12, further comprising:

a region detecting step of detecting a visible region and an invisible region in the inputted two-dimensional image.

14. The medical image processing method according to claim 13, wherein the region detecting step obtains information on a line structure in the inputted two-dimensional image and also detects a boundary portion based on the information on the line structure, and thereby determines that the visible region and the invisible region are separated by a boundary of the boundary portion.

15. The medical image processing method according to claim 13, wherein the three-dimensional model estimating step further adds voxels at predetermined positions in the invisible region based on respective voxels estimated in the visible region.

16. The medical image processing method according to claim 15, wherein the predetermined positions are positions which are symmetric with respect to the boundary portion detected by the region detecting step, from the respective voxels estimated in the visible region.

17. The medical image processing method according to claim 12, wherein the predetermined shape is a convex shape.

18. The medical image processing method according to claim 12, wherein the three-dimensional shape extracting step further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the second voxel group and the third voxel group exist within a predetermined range, the three-dimensional shape extracting step extracts the second voxel group and the third voxel group as the first voxel group.

19. The medical image processing method according to claim 13, wherein the three-dimensional shape extracting step further detects a second voxel group which is a voxel group whose three-dimensional model has been estimated as a convex shape and a third voxel group which is a voxel group whose three-dimensional model has been estimated as a roof shape, in voxel groups included in one curved plane in the three-dimensional model of the living tissue, and if the third voxel group existing in the invisible region and the second voxel group existing in the visible region exist within a predetermined range, the three-dimensional shape extracting step extracts the second voxel group and the third voxel group as the first voxel group.

20. The medical image processing method according to claim 18, wherein the three-dimensional shape extracting step further determines whether or not the third voxel group existing in the invisible region and the second voxel group existing in the visible region exist within the predetermined range, based on a distance between average coordinates of the second voxel group and average coordinates of the third voxel group.

21. The medical image processing method according to claim 13, wherein the shape feature value calculating step further calculates the shape feature values only in respective voxels in the visible region.

22. The medical image processing method according to claim 14, wherein based on peripheral region voxel information which is information on voxels existing in a peripheral region of one voxel, the shape feature value calculating step calculates the shape feature values of the one voxel, and if the shape feature value calculating step has sensed that a voxel including the boundary portion exists within the peripheral region, the shape feature value calculating step reduces peripheral voxel information used for calculating the shape feature values of the one voxel.

* * * * *